United States Patent [19]

Rialan et al.

[11] Patent Number: 5,276,655
[45] Date of Patent: Jan. 4, 1994

[54] METHOD AND DEVICE FOR SIMPLIFYING THE LOCALIZATION OF A SUBSURFACE ZONE WITHIN THE SCOPE OF A SEISMIC EXPLORATION

[75] Inventors: Joseph Rialan, rue Bigôts; Gérard Thierry, villa Blanche; Christian Grouffal, allée Louis David, all of France

[73] Assignee: Institut Francais du Petrole, Rueil-Malmaison, France

[21] Appl. No.: 920,496

[22] PCT Filed: Dec. 24, 1991

[86] PCT No.: PCT/FR91/01067
§ 371 Date: Aug. 20, 1992
§ 102(e) Date: Aug. 20, 1992

[87] PCT Pub. No.: WO92/12442
PCT Pub. Date: Jul. 23, 1992

[30] Foreign Application Priority Data

Dec. 28, 1990 [FR] France .................. 90/16433

[51] Int. Cl.$^5$ .............................. G01V 1/22
[52] U.S. Cl. ........................ 367/77; 367/76
[58] Field of Search ............ 367/76, 77; 342/356, 342/357

[56] References Cited

U.S. PATENT DOCUMENTS

| | | | |
|---|---|---|---|
| 3,946,357 | 3/1976 | Weinstein et al. | 367/77 |
| 4,589,100 | 5/1986 | Savit | 367/77 |
| 5,043,736 | 8/1991 | Darnell et al. | 342/357 |

FOREIGN PATENT DOCUMENTS

| | | |
|---|---|---|
| 0158495 | 10/1985 | European Pat. Off. |
| 0260165 | 3/1988 | European Pat. Off. |
| 0329546 | 8/1989 | European Pat. Off. |
| 9008371 | 7/1990 | European Pat. Off. |

*Primary Examiner*—Ian J. Lobo
*Attorney, Agent, or Firm*—Antonelli, Terry Stout & Kraus

[57] ABSTRACT

A method for the automatic association, with seismic signals received by receivers (R1 ... Rn) distributed on a site to be explored, of topographic data relative to the location of these receivers. The seismic signals are collected and stored by seismic acquisition devices (B1-Bn) which, after each seismic "shooting", transmit the signals successively to a central station 1. When the receivers are positioned in the field, each receiver is located by means of radiopositioning of the GPS type for example, and the position indications are introduced into an auxiliary memory of the corresponding acquisition device. After each repatriation of the data of a shooting, the indications are read in this memory and remain associated with those data at the time of the general grouping on the tape recorder of the central station.

15 Claims, 2 Drawing Sheets

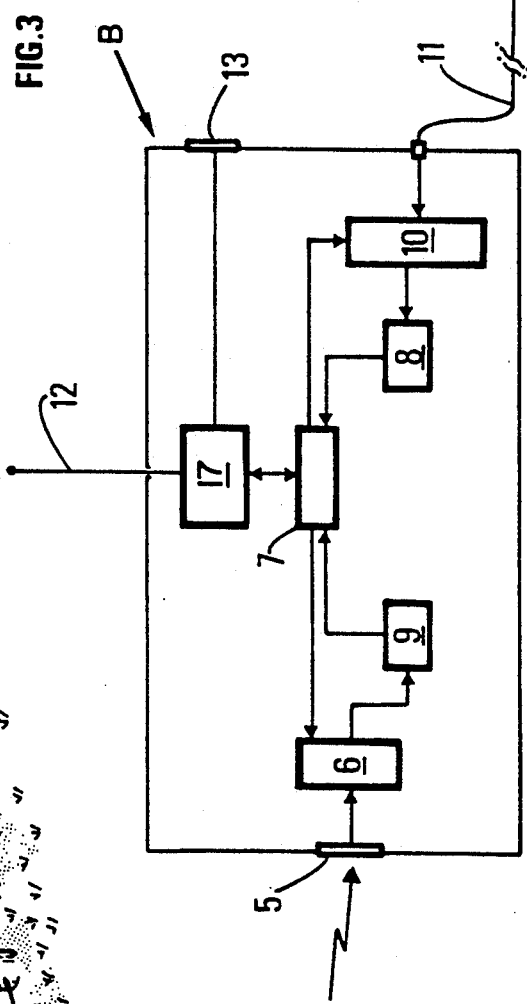
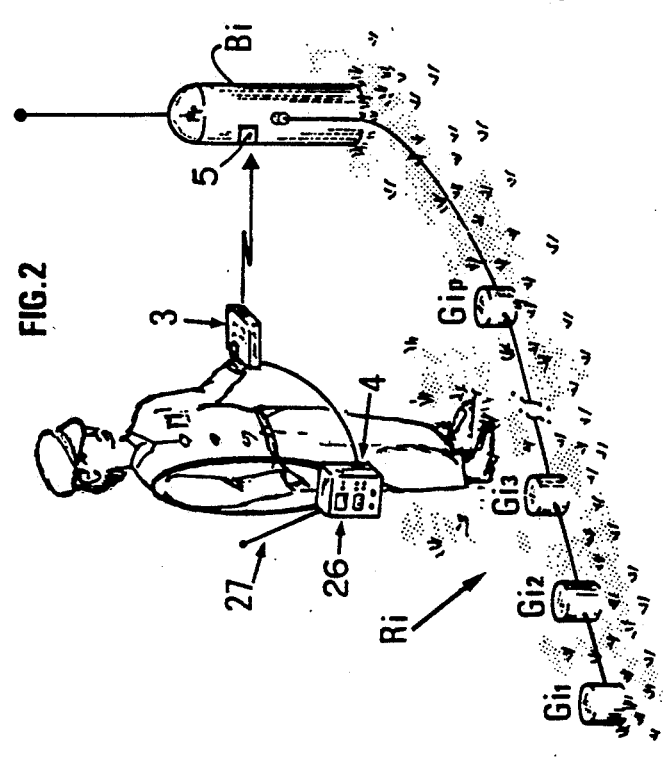
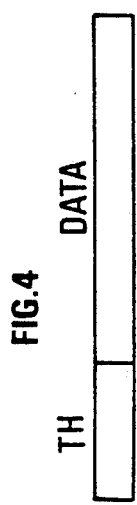

METHOD AND DEVICE FOR SIMPLIFYING THE LOCALIZATION OF A SUBSURFACE ZONE WITHIN THE SCOPE OF A SEISMIC EXPLORATION

BACKGROUND OF THE INVENTION

The present invention relates to a method for simplifying the localization of a subsurface zone studied within the scope of seismic exploration operations. More particularly, the object of the method according to the invention is to simplify the allocation operations through which seismic type data for example are associated with the topographic data of the respective places where the seismic type data have been picked up by receivers.

Seimic prospecting methods generally comprise transmission, into the formations to be explored, of seismic waves in the form of vibrations or impulses, reception of the waves which are propagated in the subsoil by a receiving set comprising a plurality of sensors arranged at the subsoil surface or close to it, recording of the waves picked up and a series of processings for improving the representativeness of the seismic sections achieved from the recordings.

Modern methods sometimes use data acquisition devices distributed at regular intervals over a distance of several kilometers. Each such device is adapted for collecting seismic signals picked up by one or several geophones, and for digitizing and storing the signals in a memory before the real or delayed time transmission thereof to a central control and recording station. The various acquisition devices generally transmit sequentially the collected data to the central station, either directly or by means of relay elements.

Various transmission systems of this type are described for example in the published French patent applications 2,627,652; 2,608,780; 2,602,875; 2,599,533; 2,538,561; 2,511,772.

The seismic sections obtained after seismic operations being representative of a subsurface zone vertical with respect to the alignment of receivers arranged in the field, it is therefore important to locate in space all the reception sites and thus to associate therewith precise topographic data.

Locating the position of the reception points is often achieved upon installing the sensors and the acquisition devices in the field. A well-known technique consists of using for example a radiopositioning system which calculates the position thereof with respect to those of several transmitters whose positions are known, located on the ground or on satellites, as is well-known to those skilled in the art. The position data read on the site of each sensor or at the barycenter of the set of interconnected sensors constituting each seismic receiver are associated for example with the serial number of the acquisition device and/or with the site number thereof in the series of devices distributed in the field. All these data collected by the field crew can be brought to the central station to be recorded there on an auxiliary recorder, which is often different from the recorder intended for the seismic data. The data must therefore necessarily be put in relation on two different supports so as to pair the seismic data with corresponding topographic indications, and this is sometimes a source of errors. Error and confusion risks also increase because of the ever larger number of acquisition devices that are set in the field for seismic exploration, which extends the transfer and pairing operations.

U.S. Pat. No. 4,589,100 describes a well-known seismic exploration system comprising a central control and recording station, a set of seismic acquisition devices distributed in the field in a grid pattern and a positioning set for determining the geographic position of the exploration system with respect to that of each of the acquisition devices in the field. The central station may comprise equipment making it possible to pick up the hertzian signals transmitted by a geographic positioning system such as the GPS system and it is provided with equipment making it possible to determine the absolute position thereof in space. Acquisition devices in the field comprise equipment sufficient for detecting signals indicative of the relative positioning thereof with respect to the central station. The received signals preprocessed in each acquisition device are transmitted to the central station and combined with those received there for determining the positioning thereof in the field.

SUMMARY OF THE INVENTION

The method according to the invention makes it possible to simplify the localization of a subsurface zone restored by a seismic section which is achieved by processing the seismic signals picked up by a set of seismic receivers in a large number of reception sites distributed in the field, in response to signals emitted in the subsoil by a seismic signal source, the seismic signals picked up being collected by a plurality of seismic acquisition devices distributed in the field and transmitted by a transmission system to a central control and recording station by using positioning means for determining the geographic position of a site from hertzian signals received on said site. The method comprises:

locating the position in the field of each seismic receiver by displacing said positioning means successively up to each receiver, transferring and storing in each acquisition device the positioning data delivered by said positioning means resulting from said locating performed for each of said receivers associated with the acquisition device, so as to constitute for each one a positioning label, automatically allocating to the seismic data collected by each receiver the corresponding positioning label, and transmitting the collected data fitted with the respective positioning labels thereof from each acquisition device, and concentrating the data in the central control and recording station, so as to constitute sets of recording traces associated each with a reception site.

According to one embodiment, transferring the positioning data determined by said positioning means occurs automatically towards each acquisition device through a transmission channel established between the device and said positioning means.

In the case where each seismic receiver comprises an alignment of several interconnected sensors, the positioning means are used, for example, for determining the geographic position of a point of each alignment.

Transmission of the collected data to the central station from each acquisition device, or from at least part of them, is achieved for example by hertzian link or by cable.

The method according to the invention, such as defined above, affords many advantages mainly due to the mode of collection and of allocation of the position data. An operator moves around in the field and positions in the vicinity of each geophone or group of geophones constituting a trace a positioning set adapted for calculating the position data from position signals provided by a hertzian-signal locating system. The position data on the site considered are introduced into the associated local acquisition device. Introduction may be achieved manually or better through a short distance transmission between the positioning set and each device, via a cable link and/or a radiation link by means of a light-ray communication box for example. The introduced position data are stored in an auxiliary memory and, at the time when the data are transmitted towards the central station, the position data are read in the auxiliary memory and included in a "shooting" header or a "trace" header. The geographic positioning data may be introduced for example at the time of the positioning of each acquisition device or box in the field. With a possibly single and therefore less costly positioning set, location labels can be successively associated with all the seismic data transmitted from the various acquisition devices, whatever the number thereof. The system according to the invention may be used with existing acquisition devices without modifying the latter.

The systematic association of a topographic address with the messages transmitted is also very useful for avoiding risks of confusion when a defective acquisition device is to be replaced by another one whose order number or serial number is different.

The device for implementing the method comprises positioning means for determining the geographic position of a site from hertzian signals received on said site, means for transferring the data measured on the site of each seismic receiver into the associated acquisition device, and an addressing set in the latter comprising means for constituting the positioning label as well as means for associating the positioning label with each one of the data transmitted.

The positioning means comprise a receiving box (2) adapted for calculating positions by triangulation from the signals received from several reference points for example, or from hertzian signals indicative of positioning data.

A wave transmission element, for example an infrared-ray transmission element, is used for example as a means for transferring the position data measured by the receiving box to the acquisition devices.

The addressing set comprises for example an optical transducer associated with an interface circuit, a processing set provided with a main memory for the seismic data and with an auxiliary memory for the data of the positioning labels, the processing set being adapted for associating with the seismic data the corresponding positioning label.

BRIEF DESCRIPTION OF THE DRAWINGS

Other features and advantages of the method and the device according to the invention will be clear from reading the description hereafter of embodiments given by way of non-limitative example, with reference to the accompanying drawings in which:

FIG. 2 shows a possible embodiment of equipment with which topographic data can be introduced in each acquisition device, FIG. 3 is a block diagram of the set contained in each acquisition device, and FIG. 4 shows a possible format for the messages transmitted to the central station from each acquisition device.

DESCRIPTION OF THE PREFERRED EMBODIMENTS

Figure 1:
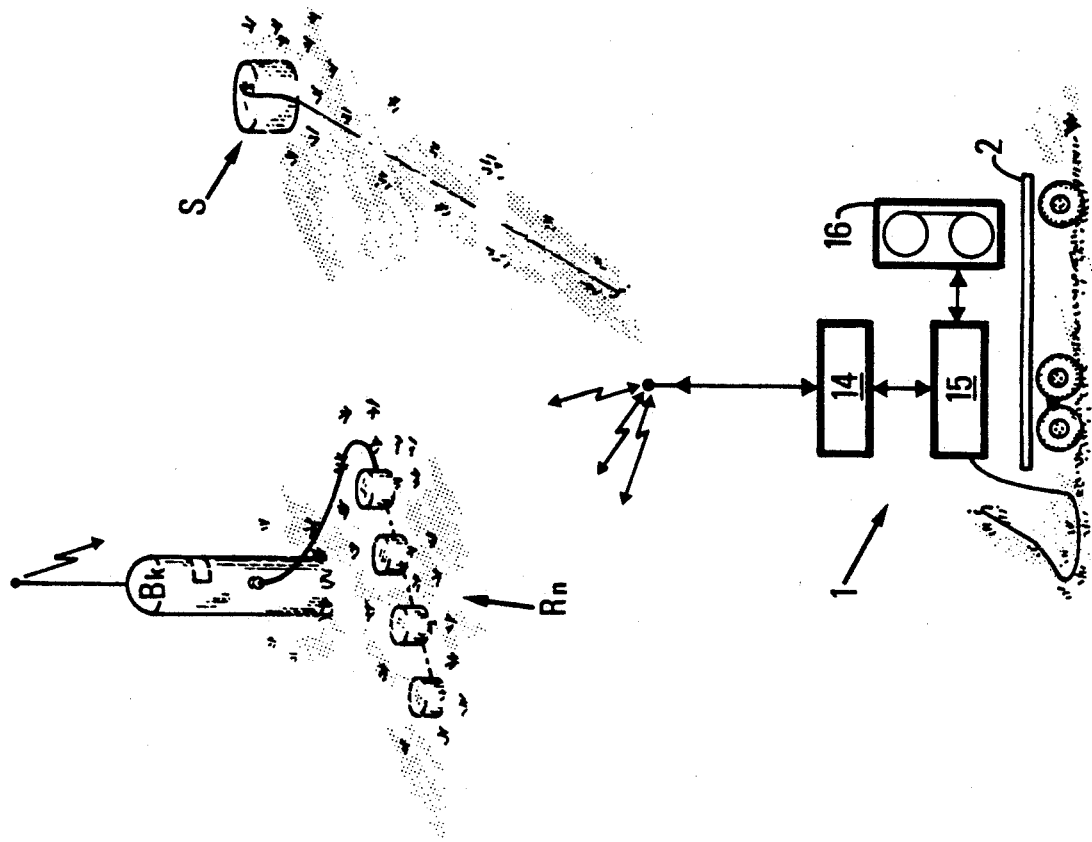
FIG. 1 diagrammatically shows a seismic receiving device arranged in the field.
Figure 1:
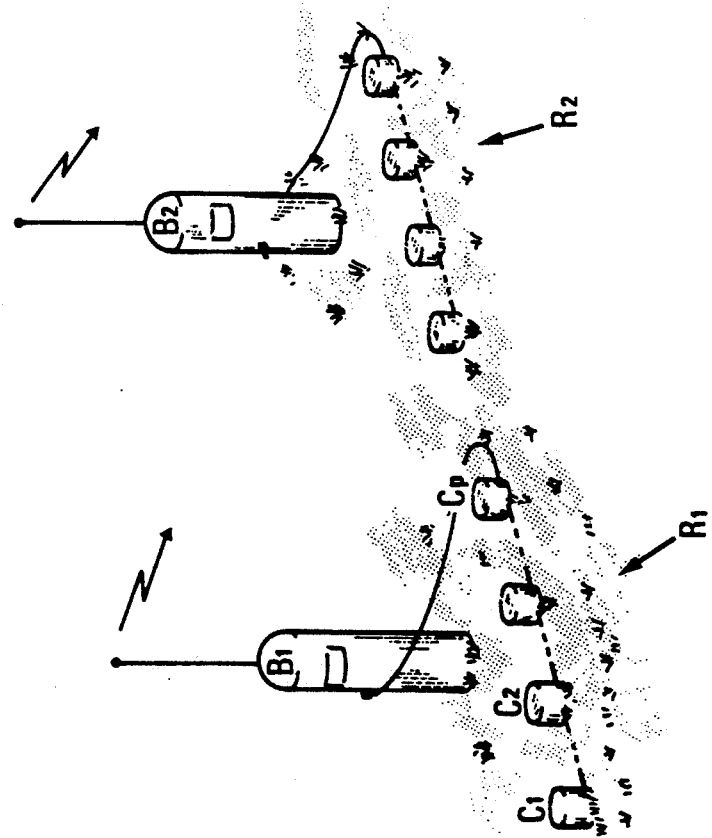

A seismic exploration system comprises a seismic wave source S and a seismic reception and acquisition device comprising generally (FIG. 1) a large number of seismic receivers R1, R2 . . . Rn which are distributed along a seismic profile to be explored, acquisition devices B1, B2 . . . Bk distributed in the field and a central control and recording station 1 installed on a vehicle 2 for managing the successive transmission-reception cycles.

Each seismic receiver R1, R2 . . . Rn comprises generally several elementary sensors C1, C2 . . . Cp electrically interconnected. Each resulting signal is used for producing a seismic recording trace. Each one of the acquisition devices B1-Bk is connected to one or several seismic receivers R. They are adapted for digitizing the signals they receive from the associated receivers and for storing them. Central station 1 controls the successive triggerings of source S and the acquisition by the various devices of the signals sent back by the subsoil discontinuities and received by receivers R1-Rn and controls thereafter the centralization of the stored data. By order of central station 1, each acquisition device B1-Bk transfers the data it has stored to the central station. The acquisition devices described in patent FR-2,511,772 for example can be advantageously used. These devices may be linked to the central station either by a common transmission cable, or by hertzian link. In the absence of a cable, each device B1-Bn communicates by radio means with the central station (case shown in FIG. 1). Connecting the cable to an acquisition device automatically cuts out the specific radio means, and communication occurs through the cable. Radio transmission systems using similar devices are also described in the published patent applications FR-2,599,533 and 2,627,652 for example.

The method according to the invention make it possible to locate with precision the subsurface zone studied through the permanent association with the seismic data received of the topographic indications of the respective places where they have been received. If each trace consists of the signal of a single sensor, this place is of course the site of the sensor. In the more usual case where a trace is produced by a group of aligned and interconnected sensors (C1-Cp), the place considered is a point of the alignment, the center thereof for example.

An operator of the crew setting the receivers on the selected exploration site determines (FIG. 2) the topographic data and includes them into the associated acquisition device.

It is convenient to use for this determination a radiopositioning device adapted for measuring the phase shifts or the time lags between signals transmitted from several located sites and for deducing therefrom the position of the reception point. A well-known positioning system in reference to satellites and/or a well-located ground station, such as the GPS (Global Positioning System) system for example, can be used to that effect. In a relative operating mode, a system of this kind gives the position of a measuring point with a precision of the order of $10^{-6}$ sufficient for the needs of seismic exploration.

In the case where this well-known positioning system is used, the operator carries a measuring box 26 fitted with a receiving antenna 27, as depicted in FIG. 2. He goes successively to the locations of the receivers on the site. He positions measuring box 26 at the center of each receiver Ri, and the receiver produces positioning indications which are immediately transferred to the associated acquisition device Bi.

Transfer can of course be achieved by connecting measuring box 26 through a cable to the acquisition device. In order to avoid displacements between the reception point and the corresponding acquisition device, measurements are preferably transferred by means, for example, of the transmission device described in patent FR-2,602,875 cited above, which is adapted for conducting signal transmissions by modulation of an infrared light beam between a transmission box 3 and an infrared receiver or optical transducer 5 on each acquisition device. The measurements provided by measuring box 26 in each seismic reception point are transferred through a link of the RS 232 type to transmission box 3 which the operator holds in his hand for example, and they are transmitted directly to acquisition device Bi through optical means 3, 5, without the operator leaving the measuring place.

An acquisition device B comprises schematically (FIG. 3) a first transmission unit 17 for managing communications with central station 1, a second infrared signal transmission-reception unit including the optical transducer 5 and an interface circuit 6 for adapting the signals received and transmitted, a central unit 7 for piloting and synchronizing acquisition and communication operations, a main memory 8 associated with an auxiliary memory 9. Main memory 8 is connected to an acquisition unit 10 adapted for amplifying, filtering, sampling and digitizing the signals received from at least one receiver Ri to which it is connected through a line 11. When several receivers are linked to a single acquisition device, the acquisition unit therein comprises a multiplexer at the input thereof. Main memory 8 is used for storing seismic data relative to a transmission-reception cycle or "shooting". Auxiliary memory 9 is linked to interface circuit 6 and is used for storing the topographic data received from the transmission box 3. The first transmission unit 17 is adapted for exchanging signals (orders, fulfilment messages and data) with the central station 1, either through hertzian link by means of an antenna 12, or possibly by means of a cable connecting onto a socket 13.

The messages corresponding to seismic data transmitted towards the central station 1 includes for example (FIG. 4) a trace header TH grouping together technical data on the acquisition achieved: filtering parameters, sampling frequency of the seismic signals, amplification gains applied, etc. The seismic data DATA stored are transmitted after this header.

The method according to the invention is achieved by including systematically the topographic data in the messages transmitted. To that effect, central unit 7 is adapted for reading at each "shooting" the auxiliary memory 9 and for including the content thereof either in a "shooting" header, or in the trace header.

Central station 1 includes a transmitting-receiving set 14 adapted for receiving the messages, by cable as well as by hertzian link. A control and synchronization set 15 decodes the messages and adds data concerning the number of the site where the seismic source has been triggered at the time of the "shooting", the number of this "shooting", the amount of main and secondary seismic traces, etc. These completed data are then formated according to a S.E.G. (Society of Exploration Geophysists) standardized format for tape recordings before being transferred for example onto a tape recorder 16 for further processing.

On each tape, the data received at a reception site are thus closely and automatically associated with the topographic data of said site. No allocation error can therefore occur.

We claim:

1. A method of collecting seismic data from a plurality of locations in a seismic field into which a seismic signal is transmitted, each location having a seismic receiver for receiving and recording seismic data resulting from the seismic signal, said method comprising the steps of:
   (a) moving a single position sensor to each of the plurality of locations;
   (b) activating the position sensor at each location to generate a position signal indicating the geographic position of the location;
   (c) recording the position signal for each location on the seismic receiver of such location;
   (d) receiving and recording seismic data at the plurality of locations, the seismic data resulting from the seismic signal; and
   (e) transmitting the position signal and the seismic data from each of the plurality of locations to a central station.

2. A method as claimed in claim 1, wherein step (c) comprises automatically transferring the position signal from the position sensor to the seismic receiver, and automatically recording the transferred position signal on the seismic receiver.

3. A method as claimed in claim 1 or 2, wherein each seismic receiver comprises a plurality of aligned interconnected seismic sensors, and wherein step (a) comprises moving the position sensor to a point along the aligned sensors, and step (b) comprises generating a position signal indicating the geographic position of said point.

4. A method as claimed in claim 1 or 2, wherein step (e) comprises transmitting the position signal and the seismic data by radio transmission.

5. A method as claimed in claim 1 or 2, wherein step (e) comprises transmitting the position signal and the seismic data by cable.

6. Apparatus for collecting seismic data from a plurality of locations in a seismic field into which a seismic signal is transmitted, comprising:
   a single position sensor adapted to be moved to each of the plurality of locations to generate and transmit a position signal indicating the geographic position of the location;
   a plurality of seismic receivers, at least one seismic receiver positioned at each of the locations for receiving seismic data resulting from the seismic signal; and
   a plurality of seismic acquisition devices, one seismic acquisition device positioned at each of the locations for receiving and recording the position signal of the location, for recording the seismic data received by the at least one seismic receiver at the location, and for transmitting the recorded position signal and seismic data to a central station.

7. Apparatus as claimed in claim 6, wherein said seismic acquisition devices record the position signal as a position label associated with the recorded seismic data.

8. Apparatus as claimed in claim 7, wherein each seismic acquisition device comprises a transducer for receiving the position signal, an auxiliary memory for recording the received position signal, a main memory for recording the seismic data, a processing circuit connected to said auxiliary memory and to said main memory for forming the recorded position signal into a position label and associating the position label with the recorded seismic data, and a transmitter for transmitting the position label and the recorded seismic data to the central station.

9. Apparatus as claimed in claim 8, wherein the transducer is an optical transducer.

10. Apparatus as claimed in claim 6, wherein said position sensor comprises a receiving box for calculating the position signal by triangulation from signals received from a plurality of reference points.

11. Apparatus as claimed in claim 6, wherein said position sensor comprises means for calculating the position signal from hertzian signals indicative of positioning data.

12. Apparatus as claimed in claim 10 or 11, wherein said position sensor includes means for transmitting the position signal by wave transmission.

13. Apparatus as claimed in claim 11, wherein said transmitting means transmits the position signal by transmitting modulated infrared waves.

14. Apparatus as claimed in claim 6, wherein each seismic acquisition device comprises a transducer for receiving the position signal, an auxiliary memory for recording the received position signal, a main memory for recording the seismic data, and a transmitter for transmitting the position signal and the seismic data to the central station.

15. Apparatus as claimed in claim 14, wherein the transducer is an optical transducer.

* * * * *